(12) United States Patent
Tamaki

(10) Patent No.: US 11,165,068 B2
(45) Date of Patent: Nov. 2, 2021

(54) MANUFACTURING OF ELECTROLYTIC MEMBRANE WITH CATIONIC OR ANIONIC ION CONDUCTING CAPABILITY COMPRISING CROSSLINKED INORGANIC-ORGANIC HYBRID ELECTROLYTE IN A POROUS SUPPORT AND ARTICLES COMPRISING THE SAME

(71) Applicant: Ryo Tamaki, Sylmar, CA (US)

(72) Inventor: Ryo Tamaki, Sylmar, CA (US)

(*) Notice: Subject to any disclaimer, the term of this patent is extended or adjusted under 35 U.S.C. 154(b) by 58 days.

(21) Appl. No.: 16/519,041

(22) Filed: Jul. 23, 2019

(65) Prior Publication Data

US 2020/0052308 A1    Feb. 13, 2020

Related U.S. Application Data

(60) Provisional application No. 62/715,980, filed on Aug. 8, 2018.

(51) Int. Cl.

| | |
|---|---|
| *H01M 4/88* | (2006.01) |
| *B01J 39/17* | (2017.01) |
| *B01J 47/12* | (2017.01) |
| *B01J 41/08* | (2017.01) |
| *B01D 69/12* | (2006.01) |
| *H01M 8/1004* | (2016.01) |

(Continued)

(52) U.S. Cl.
CPC ............ *H01M 4/881* (2013.01); *B01D 69/10* (2013.01); *B01D 69/12* (2013.01); *B01J 39/17* (2017.01); *B01J 41/08* (2013.01); *B01J 47/12* (2013.01); *H01M 8/1004* (2013.01); *H01M 8/1062* (2013.01); *H01M 8/1072* (2013.01); *B01D 2323/30* (2013.01); *B01D 2325/26* (2013.01)

(58) Field of Classification Search
CPC ............ B01D 2323/30; B01D 2325/26; B01D 69/10; B01D 69/12; B01J 39/08; B01J 39/17; B01J 41/08; B01J 47/12; H01M 2008/1095; H01M 2300/0045; H01M 2300/0082; H01M 2300/0091; H01M 4/881; H01M 8/1004; H01M 8/102; H01M 8/1037; H01M 8/106; H01M 8/1062; H01M 8/1072
See application file for complete search history.

(56) References Cited

U.S. PATENT DOCUMENTS

| | | | |
|---|---|---|---|
| 6,277,514 B1 * | 8/2001 | Ying ................... | H01M 50/409 429/129 |
| 6,365,294 B1 | 4/2002 | Pintauro et al. | |

(Continued)

OTHER PUBLICATIONS

International Search Report issued in Application No. PCT/US19/45379, dated Nov. 14, 2019 (3 pages).

(Continued)

*Primary Examiner* — Victoria H Lynch
(74) *Attorney, Agent, or Firm* — Osha Bergman Watanabe & Burton LLP

(57) ABSTRACT

Disclosed herein is an electrolytic membrane with cationic ion or anionic ion conducting capability comprising crosslinked inorganic-organic hybrid electrolyte in a porous support, wherein the inorganic-organic hybrid crosslinked electrolyte is formed by chemical born formation between Linkers and Crosslinkers, wherein Linkers and/or Crosslinkers include at least one element from Si, P, N, Ti, Zr, Al, B, Ge, Mg, Sn, W, Zn, V, Nb, Pb or S.

22 Claims, 5 Drawing Sheets

(51) Int. Cl.
  *H01M 8/1062* (2016.01)
  *H01M 8/1072* (2016.01)
  *B01D 69/10* (2006.01)

(56) References Cited

U.S. PATENT DOCUMENTS

| | | |
|---|---|---|
| 8,197,955 B2 | 6/2012 | Tamaki et al. |
| 2005/0100772 A1 | 5/2005 | Ono |
| 2009/0269644 A1 | 10/2009 | Hamrock et al. |
| 2009/0297910 A1 | 12/2009 | Zhu et al. |
| 2009/0297911 A1 | 12/2009 | Moore et al. |
| 2010/0047659 A1 | 2/2010 | Miyama et al. |
| 2011/0300466 A1 | 12/2011 | Dekel |
| 2016/0064773 A1 | 3/2016 | Choi et al. |

OTHER PUBLICATIONS

Written Opinion issued in International Application No. PCT/US19/45379, dated Nov. 14, 2019 (6 pages).
International Preliminary Report on Patentability issued in Application No. PCT/US19/45379, dated Apr. 6, 2020 (14 pages).
Feng et al.; "Imidazolium-based organic-inorganic hybrid anion exchange membranes for fuel cell applications;" Journal of Membrane Science; 2016; pp. 7-14 (8 pages).

\* cited by examiner

MANUFACTURING OF ELECTROLYTIC MEMBRANE WITH CATIONIC OR ANIONIC ION CONDUCTING CAPABILITY COMPRISING CROSSLINKED INORGANIC-ORGANIC HYBRID ELECTROLYTE IN A POROUS SUPPORT AND ARTICLES COMPRISING THE SAME

FIELD

The present invention relates to electrolytic membranes, and more particularly to electrically insulating electrolytic membrane with cationic or anionic ion conducting capability comprising crosslinked inorganic-organic hybrid electrolyte in a porous support. In particular, this invention relates to an electrolyte membrane that can be used in a fuel cell, a redox flow cell, a battery or another electrochemical conversion cell that requires transportation of ions through an electrically insulating membrane between an anode and a cathode.

BACKGROUND

In the past few decades, cation exchange membranes (CEM) fuel cells, especially proton exchange membrane (PEM) fuel cells and anion exchange membrane (AEM) fuel cells, especially hydroxide exchange membrane (HEM) fuel cells have attracted a significant amount of attention as clean, alternative electrochemical conversion and storage systems, especially for use in transport as well as in stationery and portable applications. However, the cost of the materials used in the fuel cell prohibit a proliferation of the device beyond testing environment. Especially, cost of PEM which weighs 30-40% of the total stack cost need to be reduced. Other numerous challenges lie in meeting commercial performance targets for both automotive and portable applications, especially cation or anion conductivity at low relative humidity, electrochemical, thermal stability, hydrolytic stability, mechanical in the fuel cell operation environment, prevention of fuel cross-over, and robustness.

Recent progress in lowering platinum catalyst loading in the electrode layer of the fuel cell stack also added another technical challenge. With reduced loading of the catalyst, it has become more critical to enable efficient transportation of oxygen to the catalyst site within an electrolyte that composes PEM because the distance between catalyst sites increased in the electrode with the lower catalyst loading. Thus, the electrolyte is required to have high oxygen transport capability.

Currently, Nafion®, Gore-Select® or other perfluoro sulfonic acid cation exchange membranes (CEMs) are used as polymer electrolyte membranes in commercially available fuel cells. These materials, especially Nafion®, possess good proton conductivity (>0.07 S/cm2 at 80% relative humidity at 80° C.) as well as good chemical and mechanical stability providing operation longevity of 5,000 h or more. However, the widespread use of these membranes has been limited by the cost. Some of the other critical challenges of these electrolytes impairing the achievement of long-term PEM performance in addition to cost are improvement in mechanical and chemical stability, especially the stabilities above 80° C., and prevention of fuel cross-over.

On the AEM side, there have been also intensive efforts to develop anion exchange membranes (AEMs) for energy applications. The membranes are required not only to conduct anions, but also to serve as a barrier for the fuel or charged electrolytes. So far, very few types of polymers have been utilized as AEMs in PEMFCs. The AEMs are most often based on polystyrene (PSt) crosslinked with divinylbenzene (DVB) with the quaternary ammonium group linked to a benzylic methylene group. Early studies involved the use of these polymers, owing to their low cost and easy synthesis. However, they possess several drawbacks such as low chemical and thermal stability and limited processability.

Currently commercially available CEMs and AEMs are made of polymeric materials mainly consisting of carbon as the backbone structure with ion conducting functional groups attached to the backbone.

When the membranes are exposed to cycles characterized by excessively humid or dry conditions, commercially available CEMs and AEMs experience significant dimensional changes, particularly swelling or shrinking. These dimensional changes often result in the structural failure of the membrane, resulting in formation of cracks, tears or other deformations of the membrane. These structural failures can lead to premature failure of the fuel cell.

There have been intensive research and development of alternative electrolytes to mitigate these problems. For cost reduction, commercially available polymers were used as the base for the structure and acidic groups or quarterly amines have been introduced to these carbon based polymers. Early examples include polystyrene and polyimide and their derivatives. They demonstrated a potential path for the cost reduction, but their electrochemical performances and chemical/mechanical stabilities are somewhat limited due to chemical groups that are prone to attack by hydroperoxyl radical, for example on protons in a position in polystyrene [Borriello, A.; Lavorgna, M.; Malagnino, N.; Mensitieri, G.; Napoletano, T.; Nicolais, L. Macromol. Symp. 2004, 218, 293] or attack by hydroxyl anion, for example on imide groups in polyimide [(a) Li, N.; Cui, Z.; Zhang, S.; Li, S.; Zhang, F. J. Power Sources 2007, 172, 511. (b) Li, N.; Cui, Z.; Zhang, S.; Xing, W. J. Membr. Sci. 2007, 295, 148.]). To resolve the chemical instability due to attacks by these species, other and more robust structures have been developed including poly(arylene-ether) [Pang, J.; Feng, S.; Yu, Y.; Zhang, H.; Jiang, Z. Polym. Chem. 2014, 5, 1477] and polysulfone [Iojoiu, C.; Maréchal, M.; Chabert, F.; Sanchez, J.-Y. Fuel Cells 2005, 5, 344]. These polymeric structures contributed to increase in the chemical stability and achieved a decent conductivity with high mechanical and thermal stability. However, these benefits are compromised when the number of cation or anion carrying functional groups such as sulfonic groups or quarterly amines, are increased with an aim to improve the ionic conductivity furthermore. Especially, dimensional stability deteriorates significantly at higher loading of these ion carriers.

A prior art reported by General Electric teaches a method of producing a carbon based electrolyte membrane that comprises disposing a proton conductor on a porous support [U.S. Pat. No. 8,197,955 B2]. The proton conductor is subsequently crosslinked to form a crosslinked proton conductor in the pores of the porous support. The use of the crosslinked proton conductor successfully suppressed water solubility, which increases the dimensional stability of the electrolyte membrane even with a high acid loading. Crosslinking also prevented the dissolution of electrolytes. In these methods, the proton conductor is a polyethersulfone derived from the reaction of a polyhydroxy compound with an aromatic polyhalide compound. The use of a porous support increased the mechanical stability. However, the carbon based materials still suffer poor chemical stability against attacks by hydroperoxyl radicals, low conductivity at low relative humidity (below 25%), insufficient oxygen transport at the catalyst interface. Another issue is cost of the starting materials. Polyhydroxy compounds and polyhalide compounds used for preparation of the electrolyte are not commercially readily available and increase the cost of the electrolyte.

Accordingly, therefore there is a need for CEMs and AEMs with improved conductivity at low relative humidity with mechanical and thermal stability and high oxygen conductivity at the catalyst interface, and preparing the membrane using commercially available compounds. Incorporation of inorganic moiety and construction of organic-inorganic hybrid crosslinked electrolyte in a porous support improves these properties since the inorganic moieties increase thermal and mechanical stabilities while increasing affinity with water and increase the stability against attacks by radical species.

SUMMARY

Disclosed herein is an electrolytic membrane with cationic ion or anionic ion conducting capability comprising crosslinked inorganic-organic hybrid electrolyte in a porous support. Crosslinked inorganic-organic hybrid electrolyte is formed by chemical bond formation between Linkers and Crosslinkers in a porous support, where in Linkers and/or Crosslinkers include at least one inorganic element from Si, P, N, Ti, Zr, Al, B, Ge, Mg, Sn, W, Zn, V, Nb, Pb, S.

To construct the hybrid membrane with cationic ion conducting capability, at least 20% of Linkers and/or Crosslinkers are configured such that it contains at least one ion conducting functional group that is capable of forming ionic pair with a cationic ion such as $H^+$, $Na^+$, $Li^+$, $K^+$, $Ca^{2+}$, $Mg^{2+}$, $Zn^{2+}$, $Al^{3+}$, $Fe^{3+}$ or the like.

In one embodiment, the ion conducting functional group capable of forming ionic pair with a cationic ion is sulfonic acid group, phosphoric acid group, carboxylic acid group.

To construct the hybrid membrane with anionic ion conducting capability, at least 20% of Linkers and/or Crosslinkers are configured such that it contains at least one functional group that is capable of forming ionic pair with anionic ion such as $OH^-$, $Cl^-$, $Br^-$, $CO_3^-$, $SO_4^{2-}$ or the like.

In one embodiment, the functional group capable of forming ionic pair with anionic ion is ammonium group, phosphonium group, sulfonium group, pyridinium group, guanidinium group, imidazolium group.

Linkers and Crosslinkers react and form the basic skeletal unit via chemical bonds and form the crosslinked inorganic-organic hybrid electrolyte network. Crosslinker has more than two functional groups capable of forming chemical bonds with Linker. One or more different kinds of Crosslinkers and Linkers are used to form the skeletal unit. The ion conducting functional group could be placed either on Crosslinkers or on Linkers or on both.

Linkers can form chemical bonds with each other and form linear polymers.

Crosslinkers form chemical bonds with each other and from crosslinked network.

Number of Linkers between Crosslinkers range from 0 to 1000, specifically from 1 to 100, and more specifically 0 to 10.

In one embodiment, Linker(s) and/or Crosslinker(s) comprises polysilanes, polygermanes, polystannanes, siloxane groups, silsesquioxane groups, polysilazane groups, phosphazene groups, metal oxide groups, polyoxometalate groups or mixture of these groups.

The porous support is configured in a shape of a film, a sheet or a tube having pores connected each other from one side of the support to the other side of the support.

The porous support can have a thickness of about 3 to about 1,000 micrometers, specifically about 5 to about 500 micrometers, and more specifically about 10 to about 200 micrometers. The porous support can have a porosity of about 20 to about 98 volume percent, specifically about 30 to about 95 volume percent, and more specifically about 50 to about 90 volume percent, based on the total volume of the porous support. In addition, the porous support can have an average pore size of about 0.01 to about 20 micrometers, specifically about 0.05 to about 15 micrometers, and more specifically about 0.1 to about 10 micrometers. The thickness of the porous support can be about 10 to about 500 micrometers, specifically about 20 to about 150 micrometers, and more specifically about 25 to about 50 micrometers.

The porous support is made of either fluoropolymers, organic polymers, inorganic fibers or a mixture of these.

The electrolytic membrane comprises the crosslinked inorganic-organic hybrid electrolyte in an amount of about 1 weight percent (wt %) to about 90 wt %, specifically about 10 to about 80 wt %, and more specifically about 20 to about 70 wt %, of the total weight of the electrolytic membrane.

In another embodiment, the electrolyte membrane contains less than 20% of ionic liquid.

The same inorganic-organic electrolyte is used in an anode and a cathode in an electrochemically conversion cell, especially fuel cells, redox flow cells, batteries or other electrochemical conversion cells that require transportation of ions between an anode and a cathode, or in a catalyst support. The electrolyte membrane is also used in water purification systems, as polymeric catalysts, catalyst supports, or ion exchange membranes.

BRIEF DESCRIPTION OF THE FIGURES

FIG. 1 demonstrates an example with one Linker between Crosslinkers and four reaction sites of Crosslinker utilized. Some of Linkers 1 or Crosslinker 3 have the ion conducting functional group 5.

FIG. 2 demonstrates an example with one Linker between Crosslinkers and three reaction sites of Crosslinker utilized. Some of Linkers 1 or Crosslinker 3 have the ion conducting functional group 5.

FIG. 1 demonstrates an example with one Linker between Crosslinkers and two reaction sites of Crosslinker utilized. Some of Linkers 1 or Crosslinker 3 have the ion conducting functional group 5.

FIG. 4 demonstrates an example with two Linkers between Crosslinkers, forming less Crosslinks per volume compared to the network in FIG. 1. Some of Linkers 1 or Crosslinker 3 have the ion conducting functional group 5.

FIG. 5 demonstrates an example with no Linkers between Crosslinkers, forming more Crosslinks per volume compared to the network in FIG. 1. Some of Crosslinker 3 have the ion conducting functional group 5.

DETAILED DESCRIPTION

The terms "the", "a" and "an" do not denote a limitation of quantity, but rather denote the presence of at least one of the referenced item. The suffix "(s)" as used herein is intended to include both the singular and the plural of the term that it modifies, thereby including at least one of that term (e.g., the colorant(s) includes at least one colorants). Unless defined otherwise, technical and scientific terms used herein have the same meaning as is commonly understood by one of skill in the art. As used herein, the terms "first," "second." and the like do not denote any order or importance, but rather are used to distinguish one element from another.

As used herein, approximating language can be applied to modify any quantitative representation that can vary without resulting in a change in the basic function to which it is related. Accordingly, a value modified by a term or terms, such as "about" and "substantially," cannot to be limited to the precise value specified, in some cases. In at least some instances, the approximating language can correspond to the precision of an instrument for measuring the value. Thus the modifier "about" used in connection with a quantity is inclusive of the stated value and has the meaning dictated by the context (e.g., includes the degree of error associated with measurement of the particular quantity). The notation "110%" means that the indicated measurement can be from an amount that is minus 10% to an amount that is plus 10% of the stated value. Furthermore, all ranges disclosed herein are inclusive of the endpoints and are independently combinable. The endpoints of all ranges directed to the same component or property are inclusive and independently combinable (e.g., ranges of "less than or equal to about 25 wt %, or, more specifically, about 5 wt % to about 20 wt %," is inclusive of the endpoints and all intermediate values of the ranges of "about 5 wt % to about 25 wt %," etc.).

"Optional" or "optionally" means that the subsequently described event or circumstance can or cannot occur, and that the description includes instances where the event occurs and instances where it does not. All cited patents, patent applications, and other references are incorporated herein by reference in their entirety As used herein, "support" or "supports" can be used interchangeably with "surface" or "surfaces."

While not being bound by theory, the inorganic-hybrid crosslinked network in this invention provides long term stability against hydroxy radicals, facilitates oxygen transport, increases mechanical stability, increases thermal stability, facilitates water retention, especially when more than 20% of the repeating unit contains ion conducting functional groups.

Figure 1:
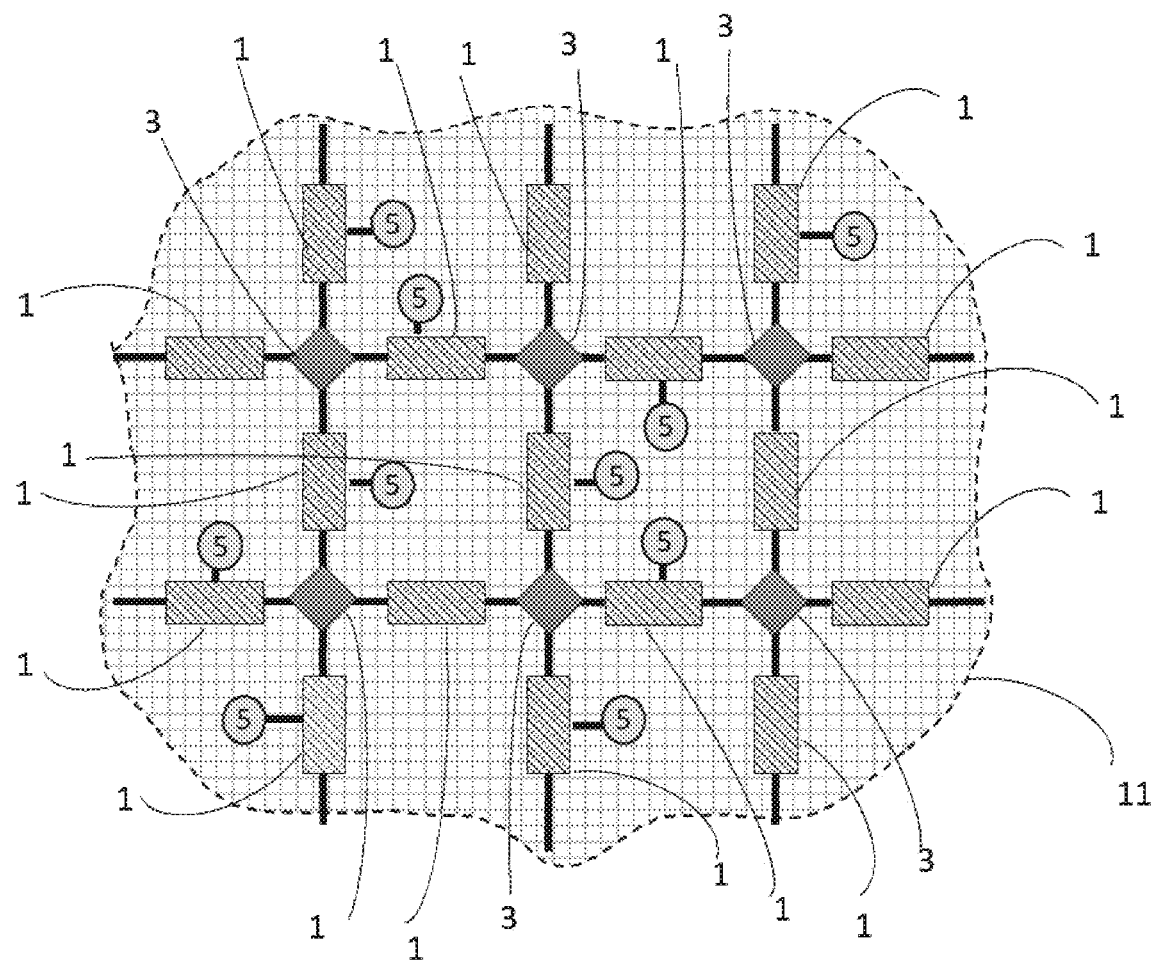
FIG. 1 illustrates a portion of the electrolytic membrane composed of crosslinked inorganic-organic hybrid electrolyte in a porous support 11. The repeating unit consists of Linker 1 and Crosslinker 3.
Figure 2:
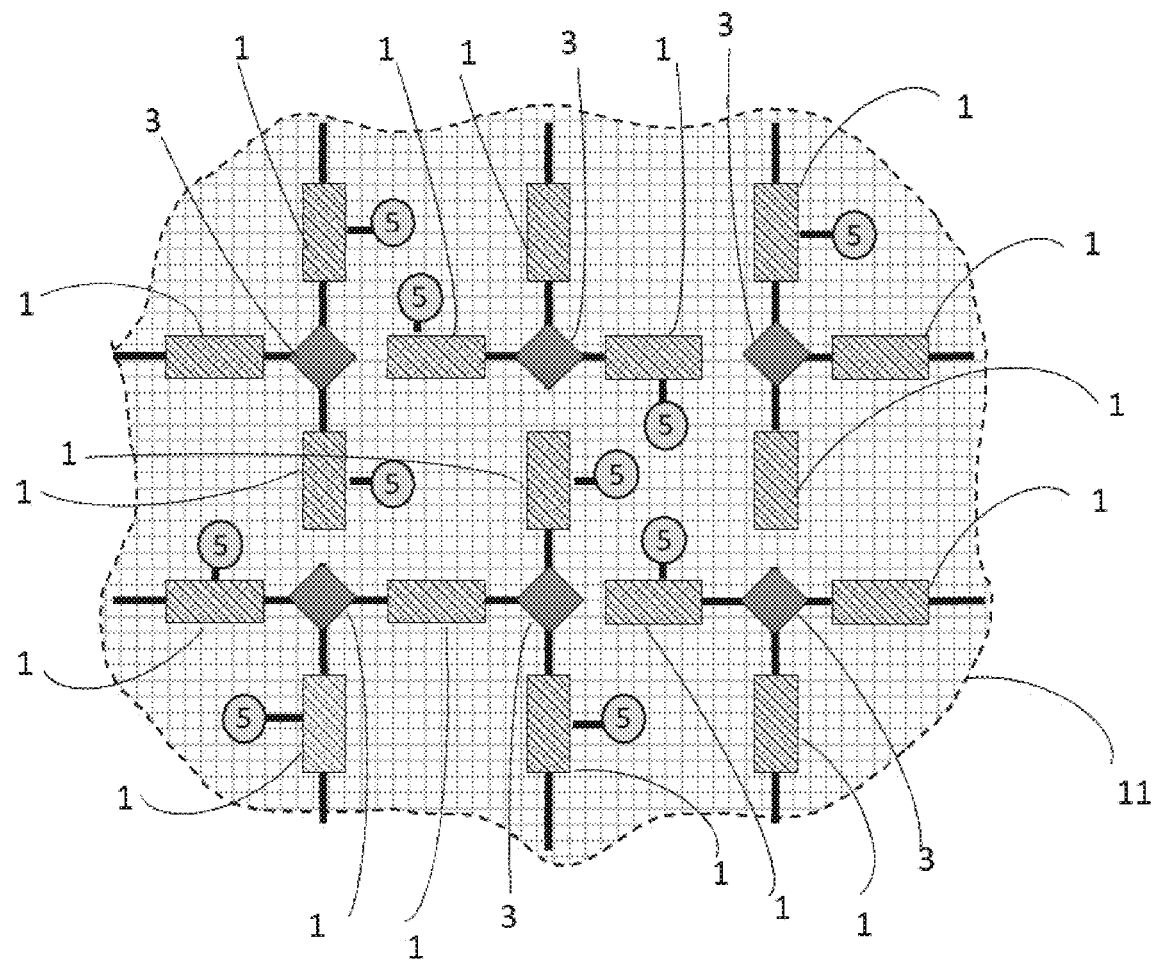
FIG. 2 illustrates a portion of the electrolytic membrane composed of crosslinked inorganic-organic hybrid electrolyte in a porous support 11. The repeating unit consists of Linker 1 and Crosslinker 3.
Figure 3:
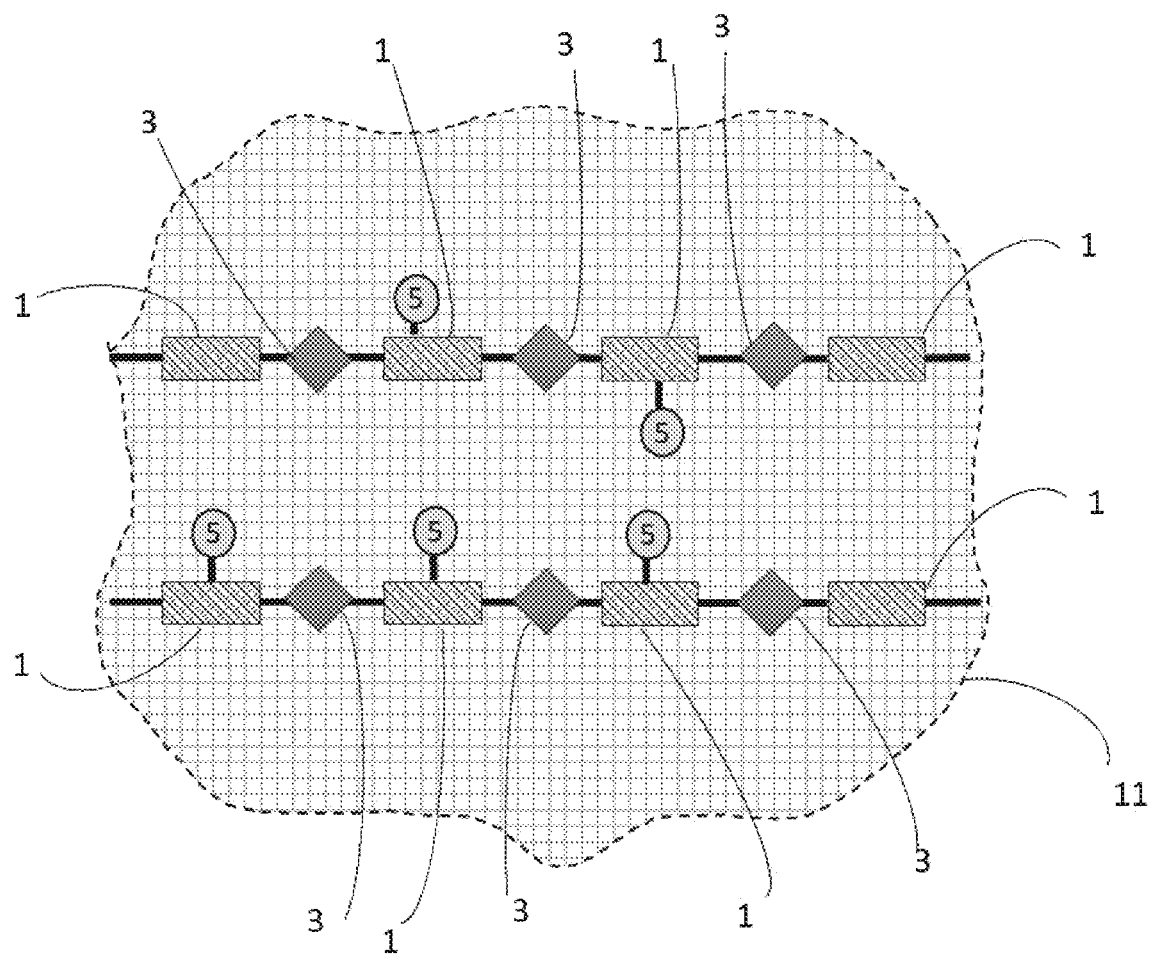
FIG. 3 illustrates a portion of the electrolytic membrane composed of crosslinked inorganic-organic hybrid electrolyte in a porous support 11. The repeating unit consists of Linker 1 and Crosslinker 3.

Disclosed herein is an electrolytic membrane with cationic ion or anionic ion conducting capability comprising crosslinked inorganic-organic hybrid electrolyte in a porous support. Crosslinked inorganic-organic hybrid electrolyte is formed by crosslink reaction between Linkers and Crosslinkers, where in Linkers and/or Crosslinkers include at least one element from Si, P, N, Ti, Zr, Al, B, Ge, Mg, Sn, W, Zn, V, Nb, Pb, S. Linkers and Crosslinkers react and form the basic skeletal unit via chemical bonds and form the crosslinked inorganic-organic hybrid electrolyte network. Crosslinker has more than two crosslinking groups capable of forming chemical bonds with Linker or by itself. Number of the crosslinking groups per Crosslinker ranges from 2 to 100, specifically from 2 to 50, more specifically 2 to 10. In some instances, only a portion of the crosslinking groups participates in the crosslinking reaction with Linkers. For example, FIG. 1 shows all the four crosslinking groups participate in the reaction, FIG. 2 shows three out of the four crosslinking groups participate in the reaction, FIG. 3 shows two out of the four crosslinking groups participate in the reaction. In order to achieve the desired properties, it is critical to make sure more than 25%, ideally 50%, more ideally 75% of the crosslinking groups of Crosslinker participate in the crosslink reaction with Linkers.

Figure 4:
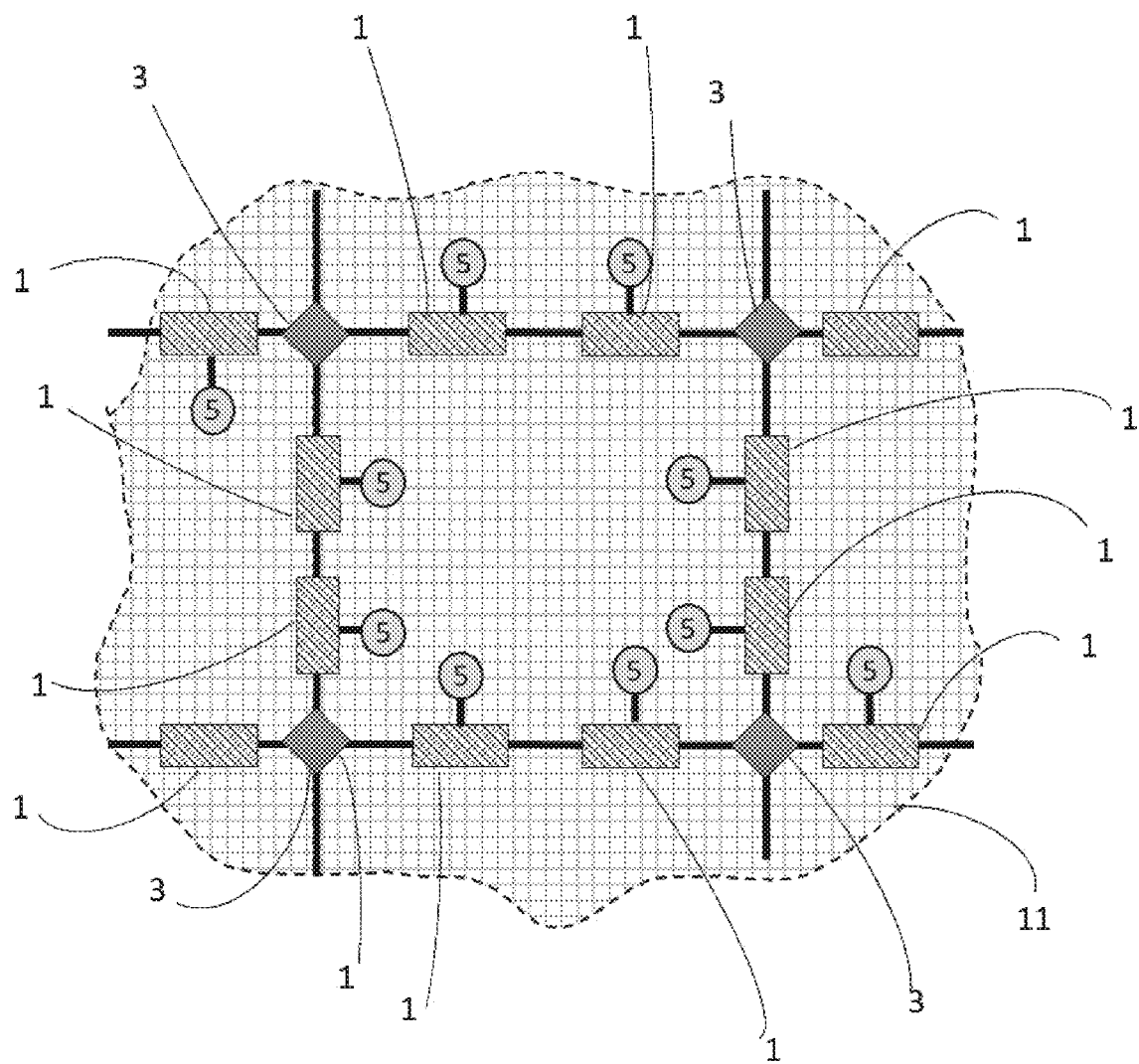
FIG. 4 illustrates a portion of the electrolytic membrane composed of crosslinked inorganic-organic hybrid electrolyte in a porous support 11. The repeating unit consists of Linker 1 and Crosslinker 3.
Figure 5:
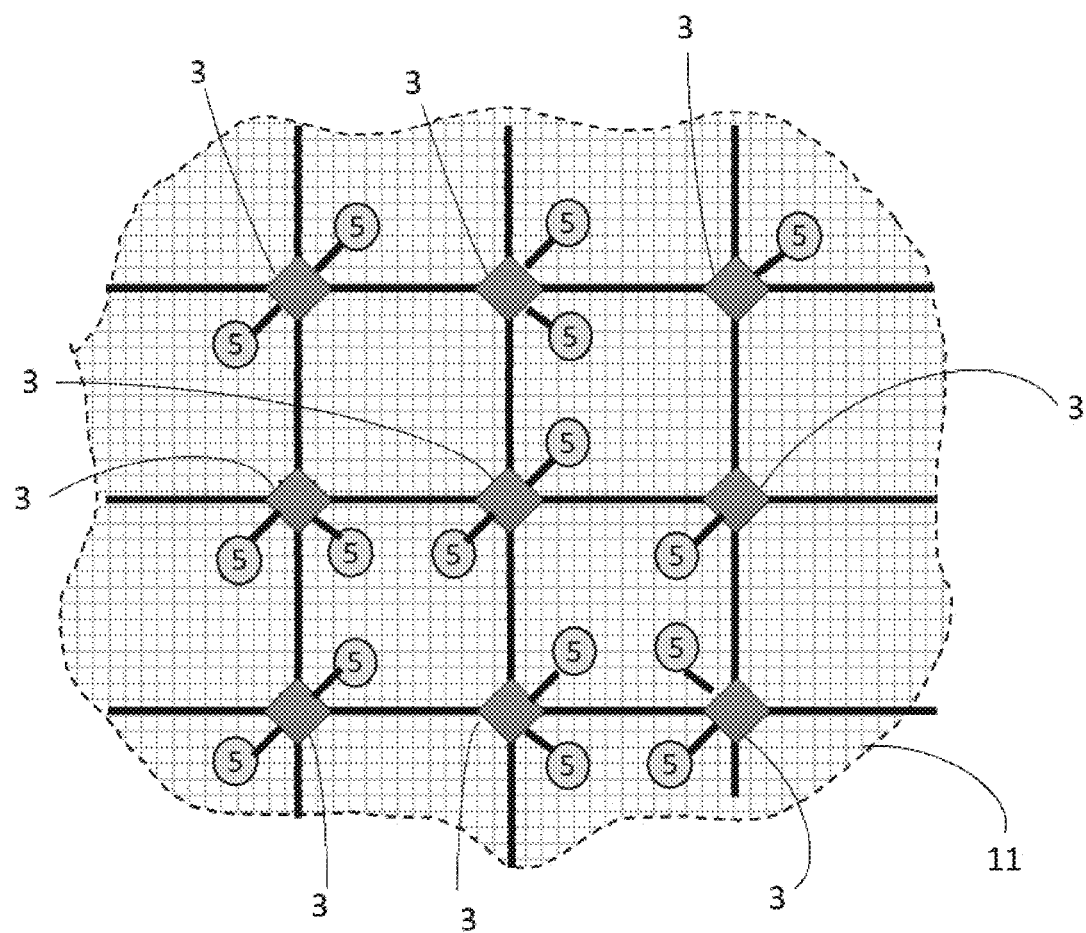
FIG. 5 illustrates a portion of the electrolytic membrane composed of crosslinked inorganic-organic hybrid electrolyte in a porous support 11. The repeating unit consists of only Crosslinker 3.

One or more different kinds of Crosslinkers and Linkers can be used to form the skeletal unit. Number of Linkers between Crosslinkers range from 0 to 1000, specifically from 1 to 100, and more specifically 0 to 10. FIGS. 1, 2 and 3 show one Linker per Crosslinkers. FIG. 4 shows two Linkers per Crosslinkers. FIG. 5 demonstrates the electrolytic membrane prepared only with Crosslinker. When the number of Linkers is more than 1000, the crosslinked network formed by Linkers and Crosslinkers possess too few crosslink densities per volume and could dissolve in water or would not have enough mechanical and thermal stabilities. Thus, it is critical to control the number of Linkers between Crosslinkers.

Linkers and Crosslinkers react to form chemical bonds such as covalent bonds, ionic bonds, dipolar bonds or metallic bonding but mainly covalent bonds. Covalent bonding is a common type of bonding in which two or more atoms share valence electrons equally. The simplest and most common type is a single bond in which two atoms share two electrons. Other types include the double bond, the triple bond, one- and three-electron bonds, the three-center two-electron bond and three-center four-electron bond. Covalent bonds are formed by, but limited to, condensation reactions, radical reactions, nucleophilic reactions, and sol-gel reactions.

Linkers and Crosslinkers are dissolved in water or in an organic solvent. Organic solvents include but not limited to tetrahydrofurane (THF), dimethyl sulfoxide (DMSO), toluene, methanol, ethanol, acetonitrile, chloroform, benzene in a concentration ranging from 0.01 wt % to 50%. In some cases, a catalyst or a reaction initiator is added to promote the chemical bond formation. In some cases, multiple kinds of Linkers, or multiple kinds of Crosslinkers are added to the same solution. In some cases, only Crosslinkers are used to form the crosslinked inorganic-organic hybrid electrolyte. The ratio of Linkers and Crosslinkers are controlled so that the number of Linkers would fall in between the target.

The mixed solution is then coated on a porous support to infiltrate pores of the porous support by the mixed solution. An industrially known coating method such as, but not limited to, gap coating, Gravure coating, immerse dip coating, kiss coating, metering rod coating, roller coating, silk screen coating, slot die coating, extrusion coating, inkjet coating could be used to infiltrate pores of the porous support by the mixed solution. Subsequently, the porous support with the mixed solution is heated at an elevated temperature. The optimum temperature changes depending on the reaction type but generally ranges from room temperature to 300° C. in air, nitrogen or argon gas.

The electrolytic membrane prepared by casting Linker/Crosslinker mixed solution onto a porous support comprises the crosslinked inorganic-organic hybrid electrolyte in an amount of about 1 weight percent (wt %) to about 90 wt %, specifically about 10 to about 80 wt %, and more specifically about 20 to about 70 wt %, of the total weight of the electrolytic membrane.

Either Linker or Crosslinker, or both possess ion conducting functional groups. The ion conducting functional groups are introduced either prior to the mixing of Linker and Crosslinker, or after formation of the crosslinked network in a porous support.

To construct the hybrid membrane with cationic ion conducting capability, at least 20% of the Crosslinkers or on Linkers are configured such that it contains at least one ion conducting functional group such as sulfonic acid group, phosphoric acid group, carboxylic acid group that is capable of forming ionic pair with a cationic ion such as $H^+$, $Na^+$, $Li^+$, $K^+$, $Ca^{2+}$, $Mg^{2+}$, $Zn^{2+}$, $Al^{3+}$, $Fe^{3+}$ or the like.

The cationic ion conducting functional group could be introduced to Linker or Crosslinker before or after the crosslink reaction using known synthetic chemistry. One example is reaction with chlorosulfonic acid, sulfuric acid, or trimethylsilyl chlorosulfonate.

To construct the hybrid membrane with anionic ion conducting capability, at least 20% of Crosslinkers or on Linkers are configured such that it contains at least one functional group such as ammonium group, phosphonium group, sulfonium group, pyridinium group, guanidinium group, imidazolium group that is capable of forming ionic pair with anionic ion such as $OH^-$, $Cl^-$, $Br^-$, $CO_3^-$, $SO_4^{2-}$ or the like.

The anionic ion conducting functional group could be introduced to Linker or Crosslinker before or after the crosslink reaction using known synthetic chemistry. One example is reaction of amines with halogenated alkanes or reaction of pyridines with halogenated alkanes.

Linkers or Crosslinkers or both contain inorganic moieties in the backbone. The inorganic moiety has a skeletal structure without the carbon atoms in the backbone. The inorganic moiety could be consisting of only one kind of atom in the main chain. Examples include polysilanes with Si—Si bonds, polygermanes with Ge—Ge bonds, or polystannanes with Sn—Sn bonds. The inorganic moiety could be also consisting of heteropolymer chains that have more than one type of atom in the main chain. Typically, two types of atoms alternate along the main chain.

An example includes Si-based inorganic moieties such as siloxane bonds (Si—O—Si). Si may have one or two aromatic or aliphatic function group, which could further be connected to the ion conducting functional groups. Another example with Si based inorganic moiety is polysilazane with Si—N—Si bond. The inorganic moiety could be formed using phosphor containing compounds such as polyphosphazenes with P—N—P bond, boron containing compounds such as boron nitride polymers with B—N—B bond, or sulfur containing compounds such as polythiazyls with S—N—S bond. The inorganic moiety could be also formed by a cluster of metal oxides. Metals in the oxides include Si, Ti, Zr, Al, B, Ge, Mg, Sn, W, Zn, V, Nb, Pb or a mixture of these. The size of the cluster ranges from 1 nm to 0.1 mm. Examples of metal oxide clusters include silica, alumina, titania, zirconia, tin oxide, tungsten oxide, and polyoxometalates. These are formed by using a metal alkoxide such as for example titanium isopropoxide, Zirconium isopropoxide, tetraethylorthosilicate, tetramethylorthosilicate as Crosslinker.

In one embodiment, Crosslinker is an alkoxysilane and the inorganic moiety that forms a repeating unit is a silsesquioxane compound as represented in formula (I), which is formed by reacting alkoxysilane with water. This type of crosslinked electrolyte has a structure as described in FIG. 5.

$$[RSiO_{1.5}]_n \qquad (I)$$

wherein Si represents silicon atom, 0 represents oxygen atom, R is a $C_{1-10}$ alkyl group, a halogen-substituted $C_{1-10}$ alkyl group, a $C_{6-16}$ aryl group, or a halogen substituted $C_{6-16}$ aryl group, and the Si is covalently connected to O in the adjacent skeletal unit, and R contains zero or 1 or 2 of a protonic or alkaline salt form of acid group such as sulfonic acid, phosphoric acid, or carboxylic acid for cation conduction, or ammonium group, phosphonium group, sulfonium group, pyridinium group, guanidinium group, imidazolium group for anion conduction. In one embodiment, more than 20% of the total repeating units contain the ion conducting functional groups.

An exemplary R group is benzyl group, naphthyl group, biphenyl group, or fluorinated derivative of these aromatic compound, or the like.

In another embodiment, Crosslinker is a bridged bisalkoxysilane and the inorganic moiety that forms a repeating unit is a bridged silsesquioxane compound and a compound of formula (II), which is formed by reacting bridged bisalkoxysilane with water. This type of crosslinked electrolyte has a structure as described in FIG. 5.

$$[SiR'SiO_{1.5}]_n - \qquad (II)$$

wherein R' is a $C_{1-10}$ alkyl group, a halogen-substituted $C_{1-10}$ alkyl group, a $C_{6-16}$ aryl group, or a halogen substituted $C_{6-16}$ aryl group, and the Si is covalently connected to O in the adjacent repeating unit, and R' contains zero or 1 or 2 of a protonic or alkaline salt form of acid group such as sulfonic acid, phosphoric acid, or carboxylic acid for cation conduction, or ammonium group, phosphonium group, sulfonium group, pyridinium group, guanidinium group, imidazolium group for anion conduction. In one embodiment, more than 20% of the total repeating units contain the ion conducting functional groups.

An exemplary R' group is benzyl group, naphthyl group, biphenyl group, or fluorinated derivative of these aromatic compound, or the like.

In another embodiment, Crosslinkers are a mixture of alkoxysilane and bridged bisalkoxysilane, which form inorganic moieties that form repeating units via reaction with water comprising at least one of a skeletal unit of (I) and (II). The ratio of a compound of formula (I) and (II) is not limited to but can be 1:10, 1:5, 1:1, 5:1, 10:1. This type of crosslinked electrolyte described in FIG. 5.

In another embodiment, Crosslinker is polychlorophosphazene and Linker is bishydroxy compound, which form the inorganic moiety that forms a repeating unit in formula (III), formula (IV) and formula (VI). This type of crosslinked electrolyte has a structure as described in FIG. 1-3.

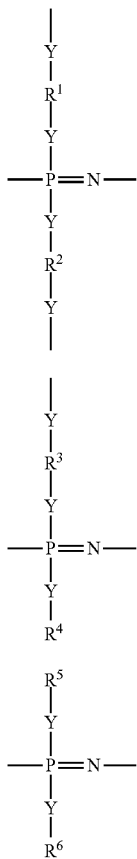

(III)

(IV)

(V)

wherein P is phosphorous atom and N is nitrogen atom, Y represents NH (nitrogen-hydrogen) group or O (oxygen), and $R^1$, $R^2$, $R^3$, $R^4$, $R^5$ and $R^6$ are each independently a $C_{1-10}$ alkyl group, a halogen-substituted $C_{1-10}$ alkyl group, a $C_{6-16}$ aryl group, or a halogen substituted $C_{6-16}$ aryl group. $R^1$, $R^2$, $R^3$, $R^4$, $R^5$ and $R^6$ contain zero or 1 or 2 of a protonic or alkaline salt form of acid group such as sulfonic acid, phosphoric acid, or carboxylic acid for cation conduction, or ammonium group, phosphonium group, sulfonium group, pyridinium group, guanidinium group, imidazolium group for anion conduction. When Y is not capped by $R^1$, $R^2$, $R^3$, $R^4$, $R^5$ and $R^6$, Y is connected to the adjacent —P═N— unit or in a protonic form. In one embodiment, more than 20% of the total repeating units possess these ion conducting functional groups. In formula (III) and (IV), another end of Y is either connected to P atom of the adjacent repeating unit or terminated by hydrogen group. Another end of N is connected to P atom of the adjacent repeating unit.

An exemplary $R^1$, $R^2$, $R^3$, $R^4$, $R^5$ and $R^6$ group is benzyl group, naphthyl group, biphenyl group, or fluorinated derivative of these aromatic compound, or the like.

In one embodiment, $R^1$, $R^2$, $R^3$, $R^4$, $R^5$ and $R^6$ group is directly attached to P without Y.

In one embodiment, the skeletal unit comprises a mixture of at least one of a compound of formula (III), (IV), (V). The ratio of a compound of formula (III), (IV) and (V) is not limited to but can be 1:1:1, 10:1:1, 10:10:1, 1:10:10, 1:1:10.

The porous support is configured in a shape of a film, a sheet or a tube having pores connected each other from one side of the support to the other side of the support.

In one embodiment, the porous support is made of fluoropolymers. Examples of suitable fluoropolymers are polytetrafluoroethylene, poly(vinylidene fluoride), poly(vinylidene fluoride co-hexafluoropropylene), poly(tetrafluoroethylene oxide-co-difluoromethylene oxide, poly (tetrafluoroethylene-co-perfluoro(propylvinyl ether)), polyvinylidene difluoride, poly(ethylene-co-tetrafluoroethylene), poly(tetrafluoroethylene co-isopropylvinyl ether), or the like, or a combination comprising at least one of the foregoing fluoropolymers.

In another embodiment, the porous support is made of organic polymers. Examples of suitable organic polymers are polysulfone, polyethersulfone, polyimide, polyetherimide, polyamide, polyamideimide, polypropylene, polyethylene, polyolefines, polybenzonitrile, polyamidesulfone, polyamidebenzonitrile, polythioethersulfone, polybenzimidazole, polyphenylene, polyarylene ether, polyacrylonitrile, polysaccharide, cellulose, cellulosic esters and ethers, polycarbonates, cellulosic polymers, polyurethanes, polyesters, polyethers, polyacrylates, copolyether esters, copolyether amides, or the like, or a combination comprising at least one of the foregoing organic polymers.

In another embodiment, the porous support is made of inorganic fibers. Examples of suitable inorganic fibers are glass fiber, carbon fiber, boron nitride fiber, zirconia fiber or the like.

Porous polytetrafluoroethylene sheet can be made by commercial processes, for example, by stretching or drawing processes, by papermaking processes, by processes in which filler materials are incorporated with the PTFE resin that are subsequently removed to leave a porous structure, or by a powder sintering process. In one embodiment, the porous polytetrafluoroethylene sheet can be a porous expanded polytetrafluoroethylene sheet having a structure of interconnected nodes and fibrils. The nodes and fibrils can define an internal structure having a three-dimensional network of interconnected passages and pathways that extend vertically, from surface to surface, and laterally, from edge to edge, throughout the membrane.

The porous support can have a thickness of about 3 to about 1,000 micrometers, specifically about 5 to about 500 micrometers, and more specifically about 10 to about 200 micrometers. The porous support can have a porosity of about 20 to about 98 volume percent, specifically about 30 to about 95 volume percent, and more specifically about 50 to about 90 volume percent, based on the total volume of the porous support. In addition, the porous support can have an average pore size of about 0.01 to about 20 micrometers, specifically about 0.05 to about 15 micrometers, and more specifically about 0.1 to about 10 micrometers. The thickness of the porous support can be about 10 to about 500 micrometers, specifically about 20 to about 150 micrometers, and more specifically about 25 to about 50 micrometers.

The electrolytic membrane comprises the inorganic-organic crosslinked electrolyte in an amount of about 1 weight percent (wt %) to about 90 wt %, specifically about 10 to about 80 wt %, and more specifically about 20 to about 70 wt %, based on the total weight of the electrolytic membrane.

In one embodiment, the electrolytic membrane comprises ionic liquid in an amount of 20 wt % or less based on the total weight of the electrolytic membrane. While not being bound by theory, ionic liquid enhances cationic ion and anionic ion conduction.

Exemplary ionic liquids are 1-Amyl-3-methylimidazolium tetrafluoroborate, 1-Butyl-3-ethylimidazolium tetrafluoroborate, 1-Butyl-3-ethylimidazolium hexafluorophosphate, 1-Butyl-3-ethylimidazolium chloride, 1-Butyl-3-methylimidazolium tetrafluoroborate, 1-Butyl-3-methylimidazolium chloride, 1-Butyl-3-methylimidazolium bromide, 1-Ethyl-3-ethylimidazolium tetrafluoroborate, 1-Ethyl-3-ethylimidazolium hexafluorophosphate, 1-Ethyl-3-methylimidazolium bromide, 1-Ethyl-3-methylimidazolium tetrafluoroborate, 1-Hexyl-3-methylimidazolium tetrafluoroborate, 1-Octyl-3-methylimidazolium tetrafluoroborate, 1-Octyl-3-methylimidazolium methyl sulfate, 1-Propyl-3-methylimidazolium tetrafluoroborate.

EXAMPLES

Example 1

6F-Bisphenol-A (0.059 mol) and sulfuric acid (40 ml) were added to a 250 ml round bottom flask equipped with overhead mechanical stirrer and a condenser. The reaction mixture was stirred vigorously at 40° C. for 18 h. After 18 h the reaction mixture was poured into 200 ml ice bath stirred with magnetic stirrer, and further neutralized with 2M NaOH solution to a final pH 8. To this solution 1.72 mol of NaCl was added and allowed to stand overnight. Finally, the precipitates (ppts) were filtered and recrystallized from a mixture of methanol and water (9/1 v/v).

Example 2

Hexachlorocyclotriphosphazene (HCCP) (obtained from Aldrich, 98%) (0.165 g, 0.476 mmol) and sulfonated 6F-Bisphenol-A (0.834 g, 1.428 mmol) from Example 1 were dissolved in 10 g of DMSO by stirring. The solution was cast onto both sides of the ePTFE, which was supported on a plastic hoop. The film was dried at 140° C. in nitrogen for 4 days. The resulting film was rinsed with distilled, deionized (DI) water to remove NaCl and then air dried at room temperature. The dried film was then soaked in a solution of 1.0M HCl for 48 h at room temperature to convert the sodium salt to the sulfonic acid. Film thickness was measured both before and after soaking in HCl solution. The film was also soaked in 50 mL DI water at 80° C. for 1 h and the weight change was measured.

Example 3

HCCP (0.442 g, 1.273 mmol) and sulfonated 6F-Bisphenol-A (0.558 g, 0.954 mmol) from Example 1 were dissolved in 10 g of DMSO by stirring. The solution was cast onto both sides of the ePTFE, which was supported on a plastic hoop. The film was dried at 140° C. in nitrogen for 4 days. The resulting film was rinsed with distilled, deionized (DI) water to remove NaCl and then air dried at room temperature. The dried film was then soaked in a solution of 1.0M HCl for 48 h at room temperature to convert the sodium salt to the sulfonic acid. Film thickness was measured both before and after soaking in HCl solution. The film was also soaked in 50 mL DI water at 80° C. for 1 h and the weight change was measured.

Example 4

HCCP (0.165 g, 0.476 mmol) and sulfonated 6F-Bisphenol-A (0.834 g, 1.428 mmol) from Example 1 were dissolved in 10 g of DMSO by stirring. The solution was cast onto both sides of the ePTFE, which was supported on a plastic hoop. The film was dried at 140° C. in nitrogen for 4 days. The resulting film was rinsed with distilled, deionized (DI) water to remove NaCl and then air dried at room temperature. The dried film was then soaked in a solution of 1.0M HCl for 48 h at room temperature to convert the sodium salt to the sulfonic acid. Film thickness was measured both before and after soaking in HCl solution. The film was also soaked in 50 mL DI water at 80° C. for 1 h and the weight change was measured.

Example 5

HCCP (0.543 g, 1.563 mmol) and sulfonated 6F-Bisphenol-A (0.457 g, 0.782 mmol) from Example 1 were dissolved in 10 g of DMSO by stirring. The solution was cast onto both sides of the ePTFE, which was supported on a plastic hoop. The film was dried at 140° C. in nitrogen for 4 days. The resulting film was rinsed with distilled, deionized (DI) water to remove NaCl and then air dried at room temperature. The dried film was then soaked in a solution of 1.0M HCl for 48 h at room temperature to convert the sodium salt to the sulfonic acid. Film thickness was measured both before and after soaking in HCl solution. The film was also soaked in 50 mL DI water at 80° C. for 1 h and the weight change was measured.

Example 6

Bistriethxybenzene (0.1 g, 0.248 mmol) and 0.1M HCl (0.0044 g, 0.248 mmolg) were dissolved in 10 g of ethanol. The solution was cast onto both sides of the ePTFE, which was supported on a plastic hoop. The film was dried at 80° C. in air for 4 days. The resulting film was soaked in 10 ml of tetrachloroethane and chlorosulfonic acid (0.0289 g, 0.248 mmol) was added while stirring. The film was then rinsed with distilled, deionized (DI) water and then air dried at room temperature. Film thickness was measured both before and after drying. The film was also soaked in 50 mL DI water at 80° C. for 1 h and the weight change was measured.

TABLE 1

| | Crosslinker/Linker mol ratio | | Number of crosslinks utilized per Crosslink | Equivalent weight per sulfonic acid (g/mol) | Crosslinked electrolyte wt in the electrolytic membrane before DI water soak at 80° C. (g) | Crosslinked electrolyte wt in the electrolytic membrane after DI water soak at 80° C. (g) | Weight loss by DI water soak | Swelling of the film after soaking in HCl solution |
|---|---|---|---|---|---|---|---|---|
| | Crosslinker | Linker | | | | | | |
| Example 2 | 1.0 | 3 | 100% | 526 | 0.916 | 0.91 | 0.66% | 4.5% |
| Example 3 | 1.0 | 1.5 | 50% | 729 | 0.928 | 0.903 | 2.69% | 3.7% |

TABLE 1-continued

| | Crosslinker/Linker mol ratio | | Number of cross-links utilized per Crosslink | Equivalent weight per sulfonic acid (g/mol) | Crosslinked electrolyte wt in the electrolytic membrane before DI water soak at 80° C. (g) | Crosslinked electrolyte wt in the electrolytic membrane after DI water soak at 80° C. (g) | Weight loss by DI water soak | Swelling of the film after soaking in HCl solution |
|---|---|---|---|---|---|---|---|---|
| | Crosslinker | Linker | | | | | | |
| Example 4 | 1.0 | 0.75 | 25% | 1004 | 0.944 | 0.623 | 34.00% | 18.0% |
| Example 5 | 1.0 | 0.5 | 17% | 1251 | 0.937 | 0.218 | 76.73% | 27.2% |
| Example 6 | 1 | 0 | 100% | 360 | 0.68 | 0.67 | 1.47% | 8.2% |

Table 1 shows Crosslinker/Linker ratio. Example 2-5 uses hexachlorocyclophosphazene as Crosslinker and has 6 crosslinking points per molecule. When number of Linker, sulfonated 6F-Bisphenol-A, is reduced per Crosslinker, the mixture does not form enough crosslinks. Because of that, the loss of the electrolyte after soaking at 80° C. water increases significantly. Thickness after soaking in HCl was also better controlled with high crosslink density. Example 6 uses bistriethoxysilyl benezene (bridged alkoxysilane, Crosslinker) as a single unit for the electrolyte network. The compound forms highly crosslinked network by itself via sol-gel reaction. The obtained electrolyte also demonstrated high electrolyte retention after 80° C. water soaking and good thickness control. On another note, all these electrolytes in the examples have low equivalent weight per sulfonic acid group compared to commercially available proton exchange membranes such as Nafion® (equivalent weight is 1,100). Since the high concentration of sulfonic acid is key for high proton conductivity, it is expected that these electrolytic membranes would provide equivalent or better conductivities than Nafion.

I claim:

1. An electrolytic membrane with cationic ion or anionic ion conducting capability comprising:
    a crosslinked inorganic-organic hybrid electrolyte in a porous support,
    the crosslinked inorganic-organic hybrid electrolyte is formed by chemical bond formation between Linkers and Crosslinkers in the porous support,
    wherein the Linkers and the Crosslinkers comprise at least one of $[Si(R)-O_{1.5}]_n$ or $[Si-R-Si-O_{1.5}]_n$ groups, where R comprises an ion conducting functional group chemically bonded to Si.
2. The electrolytic membrane of claim 1, wherein the ion conducting functional group is selected from sulfonic acid group, phosphoric acid group, or carboxylic acid group.
3. The electrolytic membrane of claim 1, wherein at least 20% of the Linkers and/or the Crosslinkers contain the ion conducting functional group, which is capable of forming ionic pair with a cationic ion selected from $H^+$, $Na^+$, $Li^+$, $K^+$, $Ca^{2+}$, $Mg^{2+}$, $Zn^{2+}$, $Al^{3+}$, or $Fe^{3+}$.
4. The electrolytic membrane of claim 1, wherein the ion conducting functional group is selected from ammonium group, phosphonium group, sulfonium group, pyridinium group, guanidinium group, or imidazolium group.
5. The electrolytic membrane of claim 1, wherein at least 20% of the Linkers and/or the Crosslinkers contain the ion conducting functional group, which is capable of forming ionic pair with an anionic ion selected from $OH^-$, $Cl^-$, $Br^-$, $CO_3^-$, or $SO_4^{2-}$.
6. The electrolytic membrane of claim 1, wherein the crosslinked inorganic-organic hybrid electrolyte and the porous support are in forms of interpenetrating network.
7. The electrolytic membrane of claim 1, wherein each Crosslinker has two or more crosslinking groups capable of forming chemical bonds with the Linkers or by themselves.
8. The electrolytic membrane of claim 1, wherein the porous support is in forms of a film, a sheet, or a tube, and has pores connected to each other from one side of the porous support to the other side of the porous support.
9. The electrolytic membrane of claim 1, wherein the porous support has a thickness of about 3 to about 1000 micrometers, or a porosity of about 20 to about 98 volume percent based on a total volume of the porous support, or an average pore size of about 0.01 to about 20 micrometers.
10. Fuel cells, redox flow cells, batteries, or other electrochemical conversion cells that require transportation of ions between an anode and a cathode, or a catalyst support using the electrolytic membrane of claim 1.
11. The electrolytic membrane of claim 1, wherein electrolytic membrane comprises ionic liquid.
12. An electrolytic membrane with cationic ion or anionic ion conducting capability comprising:
    a crosslinked inorganic-organic hybrid electrolyte in a porous support,
    the crosslinked inorganic-organic hybrid electrolyte is formed by chemical bond formation between Linkers and Crosslinkers in the porous support,
    wherein the Linkers and the Crosslinkers comprise phosphazene groups and an ion conducting group chemically bonded to the Linkers or the Crosslinkers.
13. The electrolytic membrane of claim 12, wherein the ion conducting functional group is selected from sulfonic acid group, phosphoric acid group, or carboxylic acid group.
14. The electrolytic membrane of claim 12, wherein at least 20% of the Linkers and/or the Crosslinkers contain the ion conducting functional group, which is capable of forming ionic pair with a cationic ion selected from $H^+$, $Na^+$, $Li^+$, $K^+$, $Ca^{2+}$, $Mg^{2+}$, $Zn^{2+}$, $Al^{3+}$, or $Fe^{3+}$.
15. The electrolytic membrane of claim 12, wherein the ion conducting functional group is selected from ammonium group, phosphonium group, sulfonium group, pyridinium group, guanidinium group, or imidazolium group.
16. The electrolytic membrane of claim 12, wherein at least 20% of the Linkers and/or the Crosslinkers contain the ion conducting functional group, which is capable of forming ionic pair with an anionic ion selected from $OH^-$, $Cl^-$, $Br^-$, $CO_3^-$, or $SO_4^{2-}$.
17. The electrolytic membrane of claim 12, wherein the crosslinked inorganic-organic hybrid electrolyte and the porous support are in forms of interpenetrating network.

18. The electrolytic membrane of claim 12, wherein each Crosslinker has two or more crosslinking groups capable of forming chemical bonds with the Linkers or by themselves.

19. The electrolytic membrane of claim 12, wherein the porous support is in forms of a film, a sheet, or a tube, and has pores connected to each other from one side of the porous support to the other side of the porous support.

20. The electrolytic membrane of claim 12, wherein the porous support has a thickness of about 3 to about 1000 micrometers, or a porosity of about 20 to about 98 volume percent based on a total volume of the porous support, or an average pore size of about 0.01 to about 20 micrometers.

21. Fuel cells, redox flow cells, batteries, or other electrochemical conversion cells that require transportation of ions between an anode and a cathode, or a catalyst support using the electrolytic membrane of claim 12.

22. The electrolytic membrane of claim 12, wherein the electrolytic membrane comprises ionic liquid.

\* \* \* \* \*